United States Patent
Guisinger et al.

(10) Patent No.: US 6,957,623 B2
(45) Date of Patent: Oct. 25, 2005

(54) CRITICAL TEMPERATURE INDICATOR

(76) Inventors: Robert E. Guisinger, 4487 Slate Ct., Beavercreek, OH (US) 45430; Floyd Ramp, 225 Hollywood St., Oberlin, OH (US) 44074; Randall Lane, 2695 Kings La., Lebanon, OH (US) 45036

( * ) Notice: Subject to any disclaimer, the term of this patent is extended or adjusted under 35 U.S.C. 154(b) by 0 days.

(21) Appl. No.: 10/796,445

(22) Filed: Mar. 9, 2004

(65) Prior Publication Data

US 2005/0199179 A1 Sep. 15, 2005

(51) Int. Cl.⁷ .............................................. G01K 1/02
(52) U.S. Cl. ...................... 116/216; 116/206; 116/207; 422/56; 436/164
(58) Field of Search .................. 116/216, 206, 207; 422/56, 58, 61; 436/164, 166, 157

(56) References Cited

U.S. PATENT DOCUMENTS

| | | | |
|---|---|---|---|
| 2,485,566 A * | 10/1949 | Clark | 435/29 |
| 4,145,918 A | 3/1979 | Couch | |
| 4,148,748 A * | 4/1979 | Hanlon et al. | 252/408.1 |
| 4,191,125 A | 3/1980 | Johnson | |
| 4,457,252 A | 7/1984 | Manske | |
| 4,464,473 A * | 8/1984 | Orser et al. | 435/474 |
| 4,826,762 A * | 5/1989 | Klibanov et al. | 435/28 |
| 4,997,772 A * | 3/1991 | Sutton et al. | 436/533 |
| 5,111,768 A | 5/1992 | Larsson | |
| 5,182,212 A * | 1/1993 | Jalinski | 436/2 |
| 5,239,942 A | 8/1993 | Ignacio | |
| 5,252,459 A * | 10/1993 | Tarcha et al. | 435/6 |
| 5,306,466 A * | 4/1994 | Goldsmith | 422/58 |
| 5,964,181 A * | 10/1999 | Pereyra et al. | 116/216 |
| 6,495,368 B1 * | 12/2002 | Wallach | 436/20 |

* cited by examiner

Primary Examiner—G. Bradley Bennett
Assistant Examiner—Amy R. Cohen
(74) Attorney, Agent, or Firm—R. William Graham

(57) ABSTRACT

A critical temperature indicator according to the present invention produces a visual, irreversible indication that the indicator has been subjected to a selected critical temperature. The critical temperature indicator includes a transparent housing, and a temperature sensitive transformable material operably contained within the transparent housing which includes mixture of water, nucleating agent (preferably ice nucleating active (INA) microorganisms), latex, and stabilizer which is translucent prior to exposure of a predetermined temperature and is transformed upon being subjected to the predetermined temperature to render a substantially consistent opaque material thus precluding visibility therethrough and thereby providing a sure visual sign that the indicator has been subjected to the predetermined temperature.

31 Claims, 2 Drawing Sheets

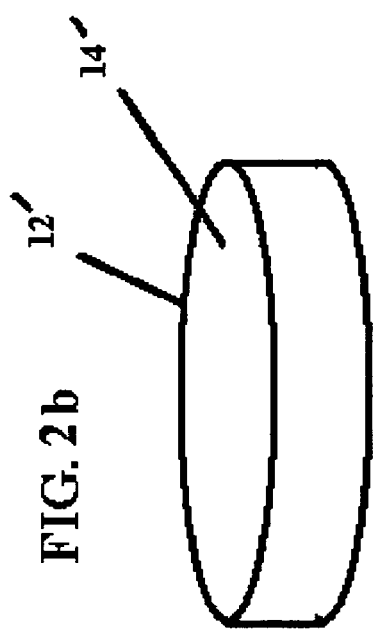
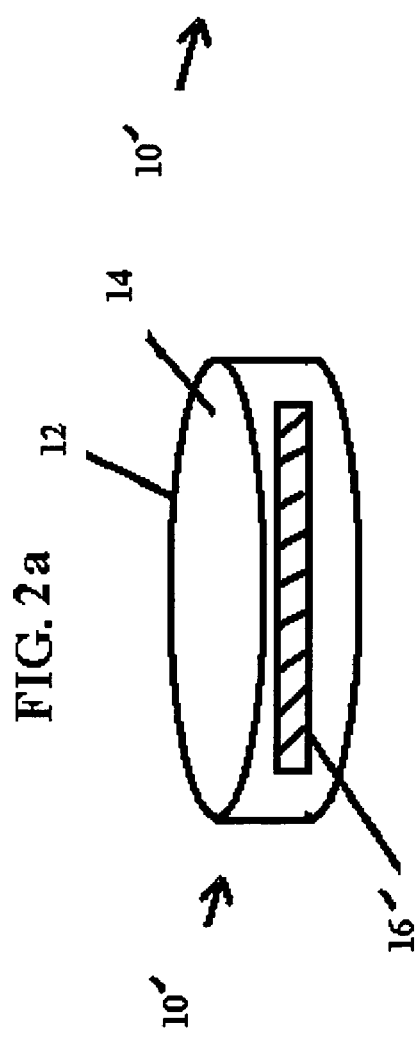

CRITICAL TEMPERATURE INDICATOR

BACKGROUND OF THE INVENTION

1. Field of the Invention

This invention relates to critical temperature indicators. More particularly, the invention relates to critical temperature indicators that provide an irreversible visual indication that the indicator has been exposed to a predetermined temperature, such as near the freezing point of water.

2. Description of the Prior Art

There are a variety of products that are temperature sensitive and when exposed to a predetermined temperature are negatively affected or rendered unusable. A few such products include foods, pharmaceuticals, blood, vaccines, paints, emulsions and beverages, for example. Thus, a critical temperature indicator can be beneficial when used with these products.

In some instances, it is important to know if the product has been frozen, while other times it is important to know if items are kept at a predetermined temperature in order that they may be preserved for use sometime later. The characteristics of the product may change to an extent that the product is useless if exposed to a critical temperature, e.g., freezing point for such product, or frozen and subsequently thawed.

Some freeze indicators have been provided which utilize the expansion characteristic of water to break a frangible ampule. These indicators can include a dye loaded pad which is triggered by water and indicates that the indicator has gone through a freeze stage.

Water based products freeze below the normal freezing point of water, i.e., 32.degree. F. (0.degree. C.), due to the super-cooling effect of water, which will permit water to stay in its liquid state substantially below its normal freezing point. For example, water may be cooled to as low as 3.2.degree. F. (−16.degree. C.) without freezing. Therefore, there is a need to sense freezing above that of normal freezing temperature.

This problem has been partially overcome by the addition of certain nucleating agents to the water. For example, cupric sulfide powder has been used as a nucleating agent to reduce the tendency of water to super-cool. Further improvements in this technology have introduced freezing point modifying additives, such as heavy water ($D_2O$), thus the temperature at which the ampule breakage occurs is near the freezing point of water.

Another style of indicator utilizes volume reduction characteristics of organic compounds as they cool. A bulb and a portion of a capillary tube of a thermometer-like structure contain a colorless organic compound. Another organic compound saturated with a dye and which is miscible with the colorless compound, is located in the capillary tube and separated from the colorless compound by a solid, movable plug or a liquid which is immiscible with either the colorless or the dyed compound. The volume of the colorless compound upon cooling is less than the volume of the bulb so that the separating plug or liquid and at least a portion of the dyed compound are drawn into the bulb cooling. The dyed compound then mixes with the colorless compound to provide a visual indication that the predetermined temperature has been reached.

While these prior indicators have met some of the needs in the field, there remains a need to improve upon the technology. Further, there remains a need to reduce the cost of the indicator.

SUMMARY OF THE INVENTION

It is an object to provide a positive indicator of when product or environment has passed a critical temperature.

It is another object to provide an irreversible critical temperature indicator.

It is another object to provide an inexpensive critical temperature indicator.

Accordingly, the present invention is directed to a critical temperature indicator that produces a visual, irreversible indication that the indicator has been subjected to a selected critical temperature. The critical temperature indicator includes a transparent housing, and a temperature sensitive transformable material operably contained within the transparent housing which includes a mixture of water, latex, nucleating agent, and stabilizing agents which is translucent prior to exposure to a predetermined temperature and is transformed upon being subjected to the predetermined temperature to render a substantially consistent opaque material thus precluding visibility therethrough and thereby providing a sure visual sign that the indicator has been subjected to the predetermined temperature.

The latex includes particles having a diameter of less than about 0.05 microns and is present in the material in an amount of from about 5 to 35% by weight, with a preferred amount being 15 weight percent. The nucleating agent is present in the material in an amount of from about 0.01 to 1.0 weight percent, with a preferred weight percent of 0.025 and includes ice nucleating active (INA) microorganisms which contain a molecular structure to attract the water and which upon reaching the predetermined temperature interacts with the latex to form the opaque material. Also included in the latex is a material designed to thermally stabilize the INA. This material chemically locks the molecular structure of the INA so that it does not change with time and/or elevated temperature. The stabilizing material can be, for example, one in the family of dialdehydes that includes glyoxal, glutaraldehyde, and terephthalaldehyde.

The critical temperature indicator further includes a colored substrate operably disposed with respect to the housing such that the colored substrate can be seen through the housing while the material is in the transparent state and is substantially invisible when the material is opaque.

Other objects and advantages will be readily apparent to those skilled in the art upon viewing the drawings and reading the detailed description hereafter.

BRIEF DESCRIPTION OF THE DRAWINGS

The preferred embodiments of the present invention are shown in the accompanying drawings where like characters of reference designate corresponding materials and parts throughout the several views thereof in which:

FIG. 2a shows an alternative embodiment of the invention in a pre-transformation phase; and FIG. 2b shows an alternative embodiment of the invention in a pre-transformation phase.

DETAILED DESCRIPTION OF THE INVENTION

Figure 1B:
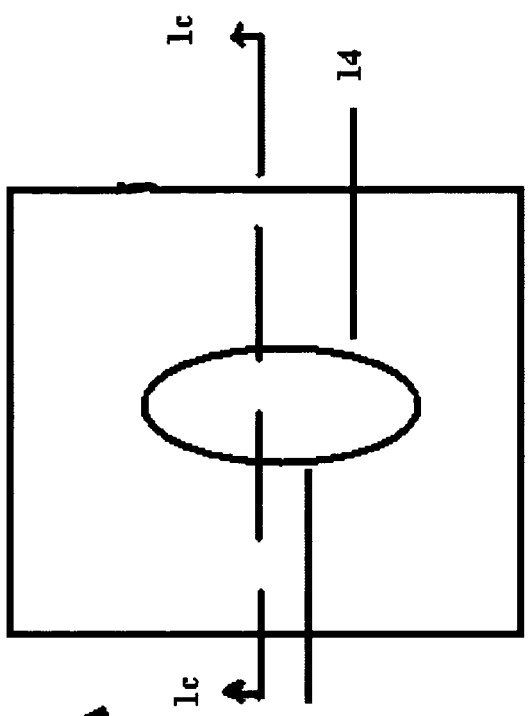
FIG. 1b is a front view of a critical temperature indicator according to the present invention in a post-transformation phase.

Referring to drawings, there are shown critical temperature indicators according to the present invention which is generally indicated by the numeral 10 and 10'. In its simplest form, the critical temperature indicator 10, 10' has a transparent plastic housing 12, 12' encapsulating a mixture of water, INA microorganism and latex collectively hereinafter referred to as the transformable material 14, 14'.

It is thought that an amount of water to be used in the invention be in a range from about 65 to 95 weight percent. Further, $D_2O$ is a preferred form of water due to it having a higher freezing point than $H_2O$. In one exemplary embodiment, the percentage of $D_2O$ is 85 weight percent.

The INA microorganism of the present invention includes bacteria, such as Pseudomonas syringae and Erwinia herbicola, which contain a molecule that attracts water, fingi or protazoa. One type of such INA microorganism found to be highly suitably for use in the invention is marketed under the name Snomax Snow Inducer from York Snow, 1433 Pittsford-Victor Road Victor, N.Y. 14564 which is an ice-nucleating protein derived from the naturally occurring ice nucleating active (INA) microorganisms, Pseudomonas syringae (31a). The Pseudomonas syringae (31a) is grown in sterilized fermentation equipment. After fermentation, the formed "Snomax" is pelletized and freeze-dried. The ice nucleating active (INA) microorganisms form of nucleating agent is found to work exceptionally well with $D_2O$ as a high temperature nucleator. Additives to increase or decrease the freezing point may be incorporated in the mixture. Other agents also may work well, such as ice nucleating active (INA) fingi and bacteria. Nucleators, found in leaves, in clouds, oceans, and animals, are INA bacteria and fungi. These are generally classified as an INA microorganism.

The latex material can be formed from organic solid particles of a polymeric resinous material (e.g., rubber) in water. Both natural and synthetic latexes may be employed, provided the chosen latex material provides the functionality of being irreversibly transformable when combined with the ice nucleating active (INA) microorganisms nucleating agent and water, preferably $D_2O$. The latex material can be acrylic, natural, nitrile, polychloroprene, paraffin, polyethylene, waxes, such as carnauba, styrene-butadiene, or vinyl pyridine based or mixtures thereof. Other potentially suitable latexes include styrene polymers, styrene/butadiene copolymers, styrene/acrylic acid copolymers, vinyltoluene/tertiarybutyl styrene copolymers, vinylidene chloride/vinyl chloride copolymers or mixtures thereof. The latex material preferably has a particle size of about 0.05 microns and is present from less than about 5 to about 30 weight percent, preferably about 15 weight percent. The latex becomes irreversibly congealed upon $D_2O$ freezing and with the aid of the ice nucleating active (INA) microorganisms nucleating agent transform the transformable material 14, 14' into an opaque material.

Figure 1A:
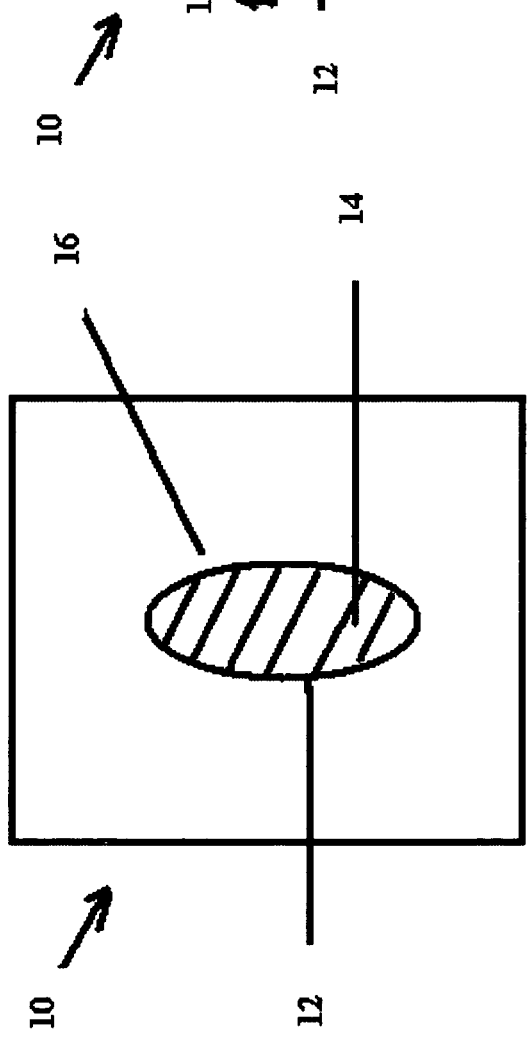
FIG. 1a is a front view of a critical temperature indicator according to the present invention in a pre-transformation phase.
Figure 1C:
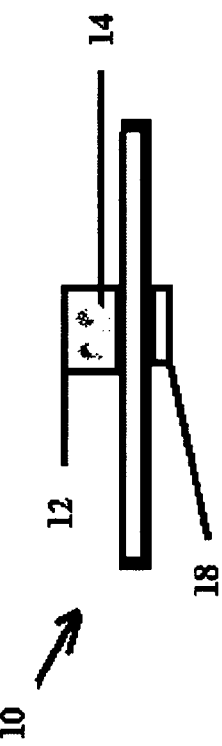
FIG. 1c is a cross section though line 1c–1c of FIG. 1b.

Also, a dyed or colored substrate, such as a backing 16 can be provided for attachment to a part of the housing 12 as seen in FIGS. 1a–1c. The colored backing 16 can be seen though through the housing 12 and translucent transformable material 14 prior to subjecting the same to a predetermined critical temperature, e.g., a freezing point of $D_2O$. Upon reaching the freezing point, the transformable material 14 is congealed to an irreversible point transforming the same such that it is no longer translucent, rather consistently opaque throughout, thereby precluding visibility of the colored backing 16. The backing 16 can be sealably mounted to the housing 12 to contain the material 14 or the housing 12 can be self-contained and adhered to the backing 16 using a transparent adhesive. A pressure sensitive adhesive material 18 can be applied to an exposed surface of the backing 16 so that indicator 10 can be adhered to a product. As an alternative to the backing, the substrate could be a colored strip 16' of plastic which is contained within a housing 12' as seen in FIGS. 2a and 2b. The strip 16' can be of a suitable size or shape so as to not interfere with the objective of the invention.

A critical temperature indicator 10, 10' is thus provided which exhibits a sure visual sign that the indicator has been subjected to freezing conditions. The encapsulation of the transformable material 14, 14' and can be accomplished by placing it in the plastic housing 12 while in its uncongealed phase. For example, a blister pack such as commonly used to package individual pharmaceutical tablets, or other like containers can be employed.

The critical temperature indicator 10, 10' can be employed by placing it against the product being monitored or inside its container. The critical temperature indicator 10, 10' will freeze just before the product itself starts to freeze since the product will act as a thermal sink.

Preferably included in the latex is a stabilizer material designed to thermally stabilize the INA. This material chemically locks the molecular structure of the INA so that it does not change with time and/or elevated temperature. The stabilizing material can be, for example, one in the family of dialdehydes that includes glyoxal, glutaraldehyde, and terephthalaldehyde.

It is understood that the scope of this invention is not limited by the embodiments disclosed and the description is shown for the purpose of illustrating the invention. It will be apparent to those skilled in the art that various changes and modifications can be made therein without departing from the spirit and the scope of the invention.

What is claimed is:

1. A critical temperature indicator which provides an irreversible visual indication that the indicator has been exposed to a predetermined critical temperature, which includes:
   a transparent housing; and
   a temperature sensitive transformable material operably contained within said transparent housing which includes mixture of water, latex, and ice nucleating active (INA) microorganism which is translucent prior to exposure of a predetermined temperature and is transformed upon being subjected to said predetermined temperature to render a substantially consistent opaque material thus precluding visibility therethrough and thereby providing a sure visual sign that said indicator has been subjected to said predetermined temperature.

2. The critical temperature indicator of claim 1, wherein said latex includes particles having a diameter of less than about 0.05 microns.

3. The critical temperature indicator of claim 1, wherein said latex is present in said material in an amount of from about 5 to 35 weight percent.

4. The critical temperature indicator of claim 1, wherein said INA microorganism is present in said material in an amount of from about 0.01 to 1.0 weight percent.

5. The critical temperature indicator of claim 1, wherein said INA microorganism includes ice nucleating active (NA) microorganisms which contain a molecular structure to attract said water and which upon reaching said predetermined temperature interacts with said latex to form said opaque material.

6. The critical temperature indicator of claim 1, wherein said latex includes one of acrylic, nitrite, polychloroprene, paraffin, polyethylene, waxes, styrene-butadiene, vinyl pyridine based, styrene polymers, styrene/butadiene copolymers, styrene/acrylic acid copolymers, vinyltoluene/tertiarybutyl styrene copolymers, vinylidene chloride/vinyl chloride copolymers or mixtures thereof.

7. The critical temperature indicator of claim 1, which further includes a colored substrate operably disposed with respect to said housing such that said colored substrate can be seen through said housing while said material is substantially transparent and is substantially invisible when said material is opaque.

8. The critical temperature indicator of claim 7, wherein said colored substrate forms part of backing to which said housing is sealably connected.

9. The critical temperature indicator of claim 7, wherein said backing has an exposed surface having a self adhesive material applied thereto.

10. The critical temperature indicator of claim 7, wherein said substrate is a colored strip contained within said housing.

11. The critical temperature indicator of claim 1, which further includes a stabilizer for said INA microorganism.

12. A critical temperature indicator which provides an irreversible visual indication that the indicator has been exposed to a predetermined critical temperature, which includes:
   a transparent housing; and
   a temperature sensitive transformable material operably contained within said transparent housing which includes mixture of water, latex, and ice nucleating active (INA) microorganism which is translucent prior to exposure of a predetermined temperature and is transformed upon being subjected to said predetermined temperature to render a substantially consistent opaque material thus precluding visibility therethrough and thereby providing a sure visual sign that said indicator has been subjected to said predetermined temperature, wherein said INA microorganism includes INA microorganisms which contain a molecular structure to attract said water and which upon reaching said predetermined temperature interacts with said latex to form said opaque material.

13. The critical temperature indicator of claim 12, wherein said latex includes particle size having a diameter of less than about 0.05 microns.

14. The critical temperature indicator of claim 12, wherein said latex is present in said material in an amount of from about 5 to 35 weight percent.

15. The critical temperature indicator of claim 12, wherein said INA microorganism is present in said material in an amount of from about 0.01 to 1.0 weight percent.

16. The critical temperature indicator of claim 12, wherein said latex includes one of acrylic, natural, nitrile, polychloroprene, paraffin, polyethylene, waxes, styrene-butadiene, vinyl pyridine based, styrene polymers, styrene/butadiene copolymers, styrene/acrylic acid copolymers, vinyltoluene/tertiarybutyl styrene copolymers, vinylidene chloride/vinyl chloride copolymers or mixtures thereof.

17. The critical temperature indicator of claim 12, which further includes a colored substrate operably disposed with respect to said housing such that said colored substrate can be seen through said housing while said material is in said transparent state and is substantially invisible when said material is opaque.

18. The critical temperature indicator of claim 17, wherein said colored substrate forms part of backing to which said housing is sealably connected.

19. The critical temperature indicator of claim 17, wherein said backing has an exposed surface having a self adhesive material applied thereto.

20. The critical temperature indicator of claim 17, wherein said substrate is a colored strip contained within said housing.

21. The critical temperature indicator of claim 12, which further includes a stabilizer for said INA microorganism.

22. A critical temperature indicator which provides an irreversible visual indication that the indicator has been exposed to a predetermined critical temperature, which includes:
   a transparent housing;
   a temperature sensitive transformable material operably contained within said transparent housing which includes mixture of water, latex, and ice nucleating active (INA) microorganism which is translucent prior to exposure of a predetermined temperature and is transformed upon being subjected to said predetermined temperature to render a substantially consistent opaque material thus precluding visibility therethrough and thereby providing a sure visual sign that said indicator has been subjected to said predetermined temperature; and
   a colored substrate operably disposed with respect to said housing such that said colored substrate can be seen through said housing while said material is in said transparent state and is substantially invisible when said material is opaque.

23. The critical temperature indicator of claim 22, wherein said latex includes particle size having a diameter of less than about 0.05 microns.

24. The critical temperature indicator of claim 22, wherein said latex is present in said material in an amount of from about 5 to 35 weight percent.

25. The critical temperature indicator of claim 22, wherein said INA microorganism is present in said material in an amount of from about 0.01 to 1.0 weight percent.

26. The critical temperature indicator of claim 22, wherein said INA microorganism includes INA microorganisms which contain a molecular structure to attract said water and which upon reaching said predetermined temperature interacts with said latex to form said opaque material.

27. The critical temperature indicator of claim 22, wherein said latex includes one of acrylic, natural, nitrile, polychloroprene, paraffin, polyethylene, waxes, styrene-butadiene, vinyl pyridine based, styrene polymers, styrene/butadiene copolymers, styrene/acrylic acid copolymers, vinyltoluene/tertiarybutyl styrene copolymers, vinylidene chloride/vinyl chloride copolymers or mixtures thereof.

28. The critical temperature indicator of claim 22, wherein said colored substrate forms part of backing to which said housing is sealably connected.

29. The critical temperature indicator of claim 22, wherein said backing has an exposed surface having a self adhesive material applied thereto.

30. The critical temperature indicator of claim 22, wherein said substrate is a colored strip contained within said housing.

31. The critical temperature indicator of claim 22, which further includes a stabilizer for said INA microorganism.

* * * * *